Figure 1:
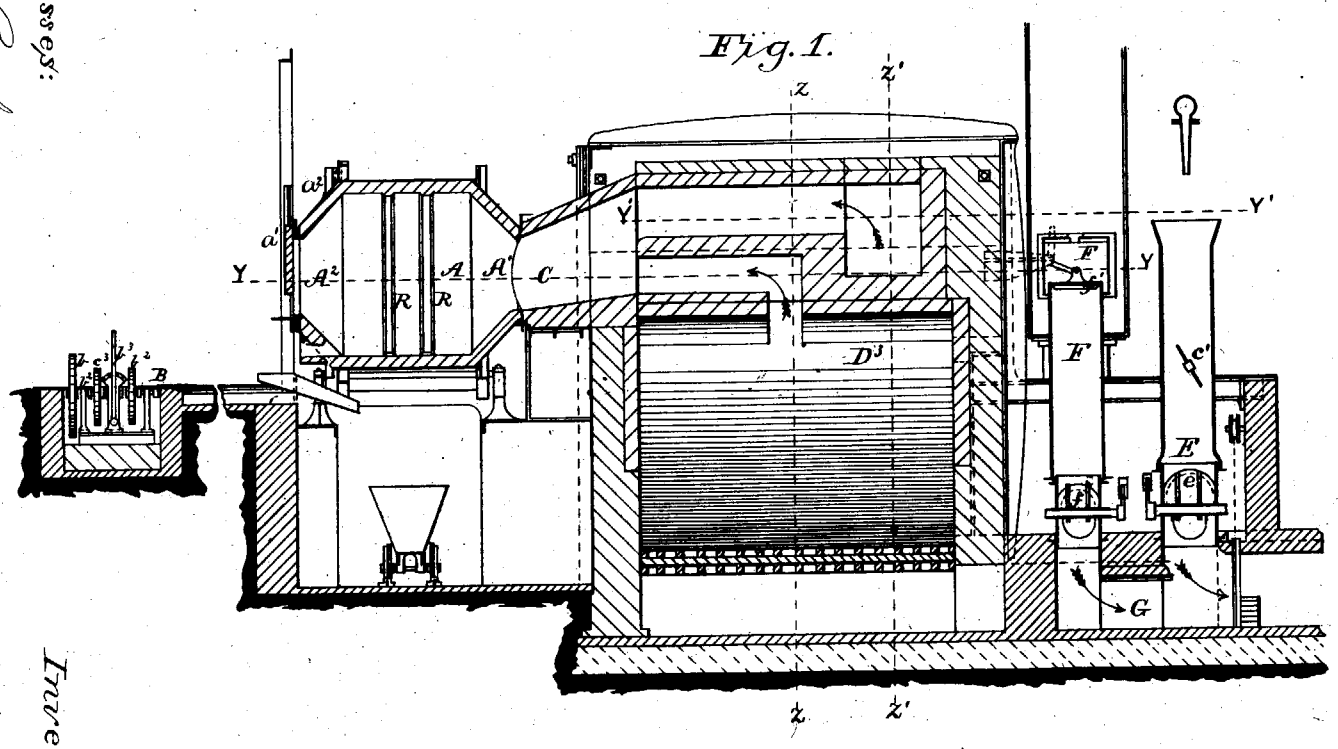

3 Sheets—Sheet 1.

C. W. SIEMENS.

MANUFACTURE OF IRON AND STEEL.

No. 9,834. Reissued Aug. 9, 1881.

Witnesses:

F. M. Burnham

J. Wallister

Inventor:

C. W. Siemens by E. S. Whitman atty.

C. W. SIEMENS.

MANUFACTURE OF IRON AND STEEL.

No. 9,834. Reissued Aug. 9, 1881.

Witnesses:

F. M. Burnham

Wm. Wister

Inventor:

C. W. Siemens by C. S. Whitman atty.

C. W. SIEMENS.

MANUFACTURE OF IRON AND STEEL.

No. 9,834. Reissued Aug. 9, 1881.

Witnesses:

F. M. Burnham.

J. W. Mister

Inventor:

C. W. Siemens by C. Whelman

Atty

UNITED STATES PATENT OFFICE

CHARLES WILLIAM SIEMENS, OF WESTMINSTER, COUNTY OF MIDDLESEX, ENGLAND.

MANUFACTURE OF IRON AND STEEL.

SPECIFICATION forming part of Reissued Letters Patent No. 9,834, dated August 9, 1881.

Original No. 159,712, dated February 9, 1875. Application for reissue filed December 3, 1880.

DIVISION C.

*To all whom it may concern:*

Be it known that I, CHARLES WILLIAM SIEMENS, of Westminster, in the county of Middlesex, England, have invented a Process of Manufacturing Cast-Steel Directly from the Ore; and I do hereby declare that the following description, taken in connection with the accompanying sheet of drawings hereinafter referred to, forms a full, clear, and exact specification of the same, wherein I have set forth the nature and principles of my said improvement, by which my invention may be distinguished from others of a similar class, together with such parts as I claim and desire to secure by Letters Patent.

Steel has been heretofore produced from blooms made direct from the ore by preheating the blooms and dissolving them in a small bath of crude iron; but processes of this character are expensive and have therefore not been commercially developed.

Attempts have been made to manufacture steel by deoxidizing the ore without fusion, withdrawing the sponge in a cold state, and charging it into an open-hearth bath.

In British Letters Patent granted to me September 20, 1866, No. 2,413, a process for the production of cast-steel directly from the ore, with or without the addition of pig-iron and of ferro-manganese, is described. This process consisted, essentially, in effecting the reduction or deoxidation of the ore by the reaction upon it of carbonaceous matter under the influence of intense furnace-heat, and in effecting the liquefaction of the reduced ore within the same furnace by the further addition of carbonaceous matter. I subsequently separated the process of deoxidizing the ore from that of effecting its liquefaction and chemical adjustment by the introduction of vertical retorts for the reduction of the ore, as described in Letters Patent of the United States granted to me April 27, 1869, No. 89,441, and rotating muffles, for the same purpose as described in Letters Patent of the United States granted to me August 17, 1869, No. 93,758.

Cast-steel may be produced by the concerted action of two separate processes, as described in Letters Patent of the United States granted to me April 11, 1871, No. 113,584, the one serving to convert the raw ore into lumps or loaves of calcined, fluxed, and partially or wholly deoxidized material, and the other to smelt and convert this material, with or without the addition of pig-metal, into cast-steel.

My present invention consists in exposing the ore mingled with fluxing materials and carbonaceous matter to intense heat while imparting to such mixture the motion incidental to the rotation of the combustion-chamber containing it for the purpose of separating the metallic particles from the ore, then subjecting the mixture to a more rapid rotation for the purpose of forming the separated metal into balls, and finally subjecting the balls to a bath of highly-heated pig-metal, as herein described.

According to my present invention I also expose the ore, mingled with fluxing materials and carbonaceous matter, to intense heat while imparting to such mixture the motion incidental to the revolution of the combustion-chamber containing it. I then subject the mixture to a more rapid rotation for the purpose of forming the separated metal into balls, and finally I subject the balls within the furnace to the action of carbonaceous matter, spiegeleisen or ferro-manganese.

In the accompanying drawings, in which corresponding parts are designated by similar letters, a rotative regenerative furnace is shown which may be used in carrying out my process.

Figure 2:
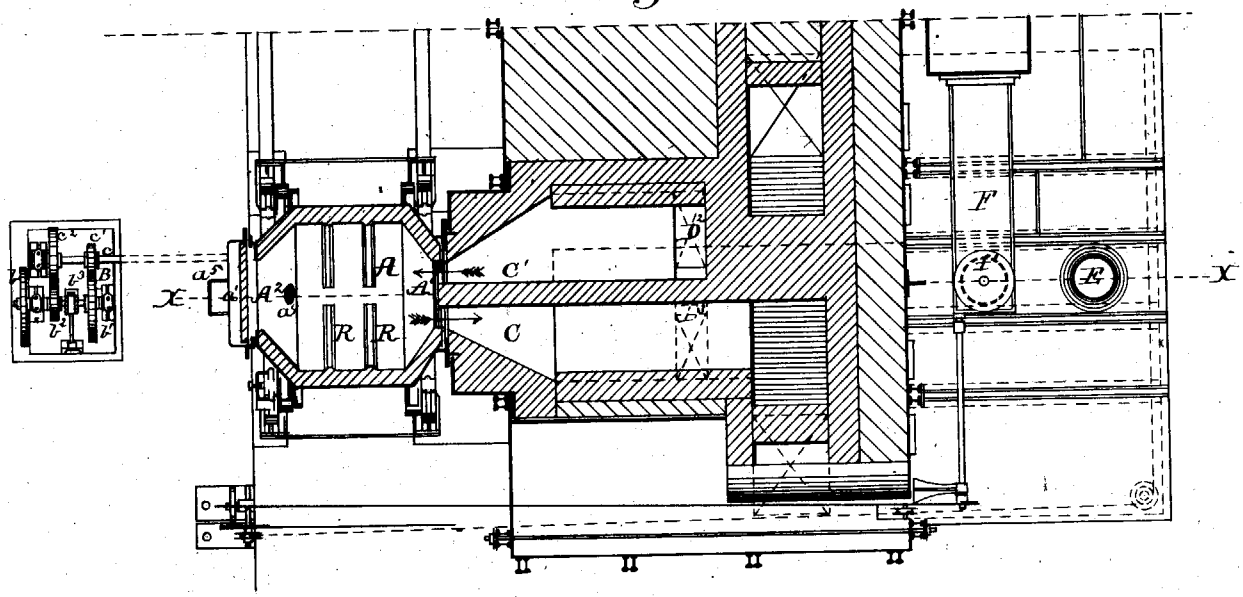
Figure 3:
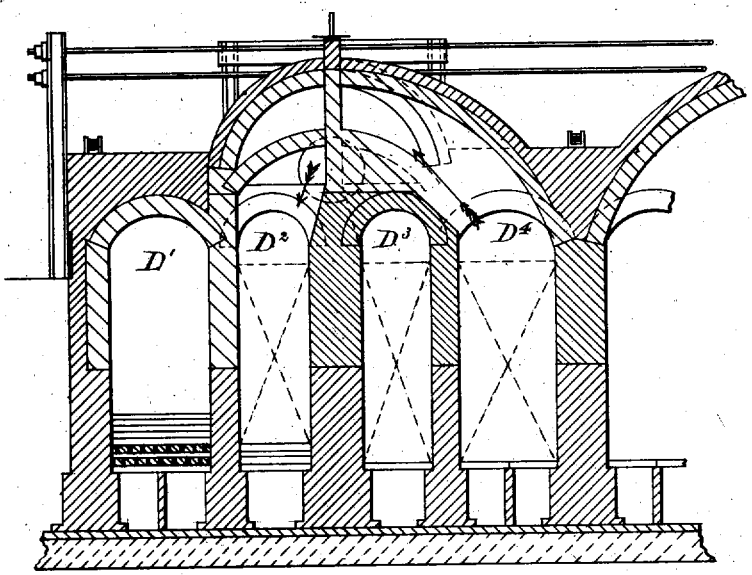
Figure 4:
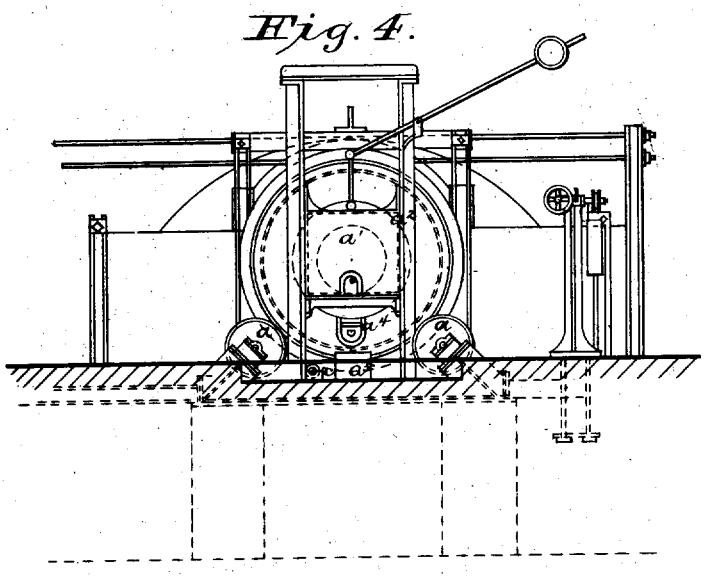

Figure 1 represents a longitudinal section on line $x\ x$ of Fig. 2. Fig. 2 represents a sectional plan on lines $y\ y\ y'\ y'$ of Fig. 1. Fig. 3 represents on the left-hand side a half-transverse section on the line $z\ z$ of Fig. 1, and on the right-hand side a half-transverse section on the line $z'\ z'$ of Fig. 1; and Fig. 4 shows a front view.

A is the rotative furnace, in shape cylindrical, with truncated conical ends. It is mounted on rollers $a\ a$, which are caused to revolve by gearing B, driven by any suitable power. The gearing B is arranged with clutch apparatus, so that the furnace can be rotated at either the slow or quick speed above referred to, or brought to rest while the prime mover continues to work at its regular speed. For this purpose the gearing B consists of a wheel, $b'$, and pinion $b^2$, loose on the shaft of the driving-wheel $b$, and gearing respectively with pinion $c'$ and wheel $c^2$ on shaft $c$, which drives the rollers $d$. By means of a clutch, $b^3$, either the wheel $b'$ or the pinion $b^2$ is geared with the driving-shaft, and thus a slow or quick speed is imparted to the rotative furnace; or by throwing the clutch out of gear the furnace is brought to rest. The throat of the furnace A′ is in communication with two flues, C and C′, each of which has two branches communicating respectively with two of four regenerative chambers, $D'$ $D^2$ $D^3$ $D^4$. The outer regenerative chambers, $D'$ $D^4$, are for heating the air, and the two inner chambers, $D^2$ and $D^3$, are for heating the gas supplied to the furnace.

The air is supplied by a main duct, E, provided with a reversing-valve, $e$, by which the supply can be turned toward either of the chambers $D'$ or $D^4$, and the throttle-valve $e'$, whereby the supply can be regulated.

In order to increase the flow of air when intense heat is required in the furnace, a jet of compressed air, $e^2$, is introduced from a blast-pipe into the middle of the duct E.

The gas from the main supply-trunk F is introduced by a duct, F′, which is provided with a stop-valve, $f'$, and with a reversing-valve, $f$, whereby the gas can be directed to either of the chambers $D^2$ or $D^3$. The air and as thus supplied to the two regenerative chambers on the one side of the structure flow thence heated into one of the flues, C or C′, where they mingle and produce a powerful flame, which plays into and sweeps around the furnace A, the products of combustion escaping by the other flues, C or C′, through the other two regenerative chambers, and thence by a flue, G, to the chimney or other outlet. When one of the two pairs of regenerative chambers has been sufficiently heated by the escaping products of combustion, and the other pair cooled by passage of the incoming air and gas through them, the valves are moved so as to alter the direction of the inflowing and outflowing currents in the manner well understood in reference to the working of regenerative gas-furnaces.

At the end $A^2$ of the furnace opposite the throat is mounted, between the guides $a^2$, a vertical sliding door, $a'$, with a counterbalance-weight, $a^3$. At the front of the furnace is formed a tap-hole, $a^4$, which can be plugged with refractory material, and under this there is a chute, $a^5$, by which material tapped from the furnace can be run into forms or molds or into a truck in a pit below the furnace.

The lining of the furnace A may be of any known suitable refractory material that is not readily affected by scoria; but I prefer to use for it a lining formed in the following manner: I take the mineral known as "bauxite," consisting, chiefly, of alumina, with a proportion of peroxide of iron. I calcine it and reduce it to powder, and mix with it from ten to fifteen per cent. of powdered plumbago, graphite, or other carbonaceous matter in a dense form, and such a quantity of argillaceous clay or other binding material as is necessary to give cohesion. I form this mixture into bricks or blocks of suitable form, and burn them in a kiln in the usual way. In burning such bricks the oxide of iron contained in the bauxite is converted by the carbonaceous matter into metallic iron, and a very refractory material is thus produced, capable of resisting the action of scoria for a considerable time. These bricks may be built inside the rotating furnace with cement made from the above-named mixture used in an unburned condition; but I prefer to build them in loosely, and after heating the furnace to a white heat to charge it with pure ore or hammer-slag while rotating slowly. The ore or slag is melted and sinks into the crevices between the bricks, serving as a cement, which binds them firmly together, and also as a glaze which prevents access of air to the interior of the bricks. When the bricks are so cemented the excess of fused ore or slag is tapped off, and the furnace is ready for work.

Having thus described a rotative regenerative furnace which may be employed, I will proceed to explain my improvements in the manufacture of steel.

The ore to be treated is crushed and mixed with a suitable proportion of lime, manganese, or other fluxing material, according to the relative amount and nature of the gangue which the ore contains, in order to form a fluid scoria; or a mixture of ores may be employed which produces a fusible slag without admixture of lime or other fluxing material. The mixed material is introduced into the slowly rotating furnace A by way of the door $a'$ and heated nearly to the fusing-point of the ore, whereupon is added a quantity of the reducing-agent, such as coal or anthracite or coke, previously crushed, but not ground fine, or charcoal or wood, previously dried and cut into pieces. The proportion of carbonaceous matter required for the conversion of a certain quantity of ore depends upon the richness of the ore and upon the nature of the carbonaceous matter employed, as well as on the nature of the iron to be produced. In each case the proportions should be determined by experience; but under ordinary circumstances about half a ton of solid carbonaceous matter to a ton of metal to be produced would be sufficient. If the reducing-agent employed be anthracite or hard coke, it may be crushed moderately fine and charged into the furnace with the ore and heated simultaneously therewith. By the slow rotation of the furnace the carbonaceous matter becomes covered by the heated ore with which it is gradually mingled, while fresh intensely-heated surface is being continually presented to the mixture. A very powerful reaction is thus produced, a quantity of carbonic oxide is evolved, which, in burning with the highly-treated air supplied from the regenerator, nearly suffices to maintain intense heat in the furnace without necessitating the admission of additional gaseous fuel. The reduction of the ore under these conditions is effected rapidly, the gangue combining with the fluxing material, so as to form a fusible slag, and the rotation of the furnace being very slow, (from four to six revolutions per hour,) the particles of metallic iron in the course of separation are not prematurely agglomerated. When the reaction is complete the rotation of the furnace is stopped and the scoria is tapped off, so as to liberate the metallic iron resulting from the reaction. A fuller supply of gaseous fuel is then turned on, and the furnace is caused to rotate five or six times more rapidly than before. This more rapid rotation has the effect of agglomerating the iron into balls, which are then taken out of the furnace and transferred, in a heated condition, to a bath of highly-heated pig-metal in a separate furnace for conversion into cast-steel. If the balls are not removed from the furnace, they are converted into cast-steel, or a pure cast metal intermediate between cast-steel and cast-iron, in the following manner: After the balls are formed the rotation of the furnace is again stopped and the fluid scoria is again tapped off, whereupon the furnace is again caused to rotate slowly. Some hard carbonaceous substance, such as crushed anthracite or coke, is then introduced, while the heat of the furnace is raised to a high intensity. The balls, combining with the carbon, become fused into a fluid mass, which can be tapped and cast into forms or molds; or, instead of introducing hard carbonaceous substances to effect the fusion of the balls, spiegeleisen or ferro-manganese may be employed for the same purpose, spiegeleisen or ferro-manganese being especially desirable or necessary if malleable cast-steel is to be produced.

Having thus described my invention, I claim and desire to secure by Letters Patent of the United States—

1. The process of making steel which consists in exposing the ore mingled with fluxing materials and carbonaceous matter to intense heat while imparting to such mixture the motion incidental to the rotation of the combustion-chamber containing it for the purpose of separating the metallic particles from the ore, then subjecting the mixture to a more rapid rotation for the purpose of forming the separated metal into balls, and finally subjecting the balls to a bath of highly-heated pig-metal, as herein described.

2. The process of making steel which consists in exposing the ore mingled with fluxing materials and carbonaceous matter to intense heat while imparting to such mixture the motion incidental to the revolution of the combustion-chamber containing it, then subjecting the mixture to a more rapid rotation for the purpose of forming the separated metal into balls, and finally subjecting the balls within the furnace to the action of carbonaceous matter, spiegeleisen or ferro-manganese, as herein described.

C. WILLIAM SIEMENS.

Witnesses:
GEO. WOOLLETT,
H. T. THRUPP,
*Clerks to Ridgway Bros., 2 Waterloo Place, Pall Mall, London, Notaries.*